United States Patent
Richardson et al.

(10) Patent No.: US 9,206,603 B2
(45) Date of Patent: Dec. 8, 2015

(54) GRID SYSTEM FOR SUPPORTING A SUSPENDED CEILING AND CEILING MOUNTED EQUIPMENT

(75) Inventors: Laird I. Richardson, Colton, OR (US); Zareer Cursetjee, Clackamas, OR (US)

(73) Assignee: Nortek Air Solutions, LLC, Eden Prairie, MN (US)

( * ) Notice: Subject to any disclaimer, the term of this patent is extended or adjusted under 35 U.S.C. 154(b) by 119 days.

(21) Appl. No.: 12/148,019

(22) Filed: Apr. 15, 2008

(65) Prior Publication Data

US 2009/0255203 A1 Oct. 15, 2009

(51) Int. Cl.
| | |
|---|---|
| *E04C 2/52* | (2006.01) |
| *E04B 9/06* | (2006.01) |
| *E04B 9/12* | (2006.01) |
| *H02G 3/38* | (2006.01) |
| *E04B 9/00* | (2006.01) |
| *E04C 3/04* | (2006.01) |

(52) U.S. Cl.
CPC . *E04B 9/06* (2013.01); *E04B 9/064* (2013.01); *E04B 9/127* (2013.01); *H02G 3/281* (2013.01); *E04B 9/006* (2013.01); *E04C 2003/0421* (2013.01); *E04C 2003/0434* (2013.01); *E04C 2003/0452* (2013.01)

(58) Field of Classification Search
CPC ........... E04B 9/006; E04B 9/008; E04B 9/06; E04B 9/127; E04B 9/064; F21Y 8/06; H02G 3/281; E04C 2003/0452; E04C 2003/0434; E04C 2003/0421
USPC ................. 52/220.6, 506.07, 506.08, 506.09, 52/506.1; 362/148, 150
See application file for complete search history.

(56) References Cited

U.S. PATENT DOCUMENTS

| | | | | | |
|---|---|---|---|---|---|
| 3,001,001 | A | * | 9/1961 | Bibb | 174/71 R |
| 3,207,057 | A | * | 9/1965 | Brown et al. | 454/301 |
| 3,504,172 | A | | 3/1970 | Liberman | |
| 3,742,674 | A | * | 7/1973 | Lang | 52/666 |
| 3,761,603 | A | * | 9/1973 | Hays et al. | 174/101 |
| 4,794,745 | A | * | 1/1989 | Platt et al. | 52/506.07 |
| 5,454,756 | A | * | 10/1995 | Ludwig | 454/296 |
| 5,469,681 | A | * | 11/1995 | Wu | 52/656.9 |
| 5,613,759 | A | * | 3/1997 | Ludwig et al. | 362/149 |
| 5,687,527 | A | * | 11/1997 | Bikard et al. | 52/506.08 |

(Continued)

FOREIGN PATENT DOCUMENTS

| | | |
|---|---|---|
| CN | 101649662 A | 2/2010 |
| EP | 2110489 A1 | 10/2009 |

(Continued)

OTHER PUBLICATIONS

International Search Report; 4 pgs.

(Continued)

*Primary Examiner* — Brian Glessner
*Assistant Examiner* — Joshua Ihezie
(74) *Attorney, Agent, or Firm* — Schwegman Lundberg & Wessner, P.A.

(57) ABSTRACT

A grid system for supporting a suspended ceiling and ceiling mounted equipment includes a plurality of grid elements which are interconnected in a orthogonal grid pattern. The grid elements have a wire raceway located at their upper end which is accessible from above the grid element. Flanges located at lower portions of the grid elements engage the equipment supported by the grid system.

23 Claims, 4 Drawing Sheets

(56) References Cited

U.S. PATENT DOCUMENTS

| | | | |
|---|---|---|---|
| 5,794,397 A * | 8/1998 | Ludwig | 52/506.08 |
| 6,158,186 A * | 12/2000 | Feller | 52/506.06 |
| 6,651,399 B2 * | 11/2003 | Li | 52/506.07 |
| 6,779,315 B1 * | 8/2004 | Bongio et al. | 52/506.07 |
| 7,260,919 B1 | 8/2007 | Spransy et al. | |
| 7,287,733 B2 * | 10/2007 | Bongio et al. | 248/235 |
| 2003/0097809 A1 * | 5/2003 | Li | 52/506.07 |
| 2003/0106276 A1 * | 6/2003 | Tallman et al. | 52/506.06 |
| 2003/0213199 A1 * | 11/2003 | Bongio et al. | 52/506.01 |

FOREIGN PATENT DOCUMENTS

| | | |
|---|---|---|
| EP | 2110489 B1 | 10/2012 |
| FR | 2 745 316 | 8/1997 |
| FR | 2745316 | 8/1997 |
| FR | 2 758 840 | 7/1998 |
| FR | 2758840 | 7/1998 |

OTHER PUBLICATIONS

International Search Report; mailed Jul. 19, 2010, 5 pgs.

"Chinese Application Serial No. 200910133195.6, Decision of Rejection mailed Dec. 18, 2013", 10 pgs.

"Chinese Application Serial No. 200910133195.6, Office Action mailed Mar. 5, 2012".

"Chinese Application Serial No. 200910133195.6, Office Action mailed May 21, 2013".

"Chinese Application Serial No. 200910133195.6, Office Action mailed Sep. 12, 2013".

"Chinese Application Serial No. 200910133195.6, Office Action mailed Dec. 20, 2012".

"European Application Serial No. 09251092.4, Examination Notification Art. 94(3) mailed Mar. 2, 2010", 1 pg.

"European Application Serial No. 09251092.4, Examination Notification Art. 94(3) mailed Jun. 14, 2011", 3 pgs.

"European Application Serial No. 09251092.4, Examination Notification Art. 94(3) mailed Jul. 19, 2010", 5 pgs.

"European Application Serial No. 09251092.4, Examination Notification Art. 94(3) mailed Dec. 22, 2010", 5 pgs.

"European Application Serial No. 09251092.4, Extended European Search Report mailed Jul. 6, 2009", 6 pgs.

"European Application Serial No. 09251092.4, Office Action mailed Feb. 23, 2012", 9 pgs.

"European Application Serial No. 09251092.4, Office Action mailed Aug. 31, 2012", 7 pgs.

"European Application Serial No. 09251092.4, Office Action mailed Sep. 6, 2012", 2 pgs.

"European Application Serial No. 09251092.4, Response filed Apr. 27, 2011 to Office Action mailed Dec. 22, 2010", 13 pgs.

"European Application Serial No. 09251092.4, Response filed Jun. 30, 2010 to Office Action mailed Mar. 2, 2010", 15 pgs.

"European Application Serial No. 09251092.4, Response filed Aug. 16, 2011 to Office Action mailed Jun. 14, 2011", 2 pgs.

"European Application Serial No. 09251092.4, Response filed Nov. 15, 2010 to Office Action mailed Jul. 19, 2010", 10 pgs.

"European Application Serial No. 09251092.4, Response filed Dec. 13, 2011 to Office Action mailed Sep. 16 2011", 45 pgs.

"European Application Serial No. 09251092.4, Summons to Attend Oral Proceedings mailed Sep. 16, 2011", 4 pgs.

* cited by examiner

GRID SYSTEM FOR SUPPORTING A SUSPENDED CEILING AND CEILING MOUNTED EQUIPMENT

BACKGROUND OF THE INVENTION

This invention relates to a grid system for a suspended ceiling and in particular to a grid system having the grid elements with raceways in which wires can be carried.

Suspended ceilings which support equipment are common in many types of commercial buildings. Clean rooms used in chip manufacture and hospitals use ceilings to support fan filter units, lights and other equipment. This equipment has wiring that provides power (high voltage wiring) and control systems (low voltage wiring). This wiring is located above the ceiling and is typically placed in raceways to protect the wire and keep it contained. Separate raceways typically are used for the high voltage and low voltage wiring.

The equipment is located throughout the ceiling so the raceways must run both longitudinally and laterally. As a result, the raceways utilize considerable space above the ceiling preventing this space from being fully utilized to contain other components and making it difficult for workers maintaining the equipment mounted in the ceiling from working in the space. In addition, since the raceways and wiring must be installed on site, after the ceiling system is installed, the installation of the wiring is expensive and the overall time necessary for constructing the space is increased. In addition, the wiring is easily disturbed by technicians working in the space.

Prior art ceiling grid systems have included raceways in the ceiling grid elements to decrease the amount of clutter and keep the wire better organized. These grid elements include a single raceway and the raceways have been located at the bottom of the grid elements. As a result the raceways cannot carry both high and low voltage wire and they must be accessed from below the ceiling. Thus, separate raceways must still be placed above the suspended ceiling and at least a portion of the wiring must be installed on site after the ceiling system is in place. As a result, the prior art ceiling grid systems do not completely solve the foregoing wiring problems with suspended ceiling systems of this type.

BRIEF SUMMARY OF THE INVENTION

The subject invention overcomes the limitations and shortcomings of the prior art suspended ceiling systems by providing a plurality of grid elements which are interconnected in an orthogonal grid pattern. An upper raceway is located at the upper portion of the grid element. The upper raceway has side by side sidewalls and a bottom and is accessible from above the grid system.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
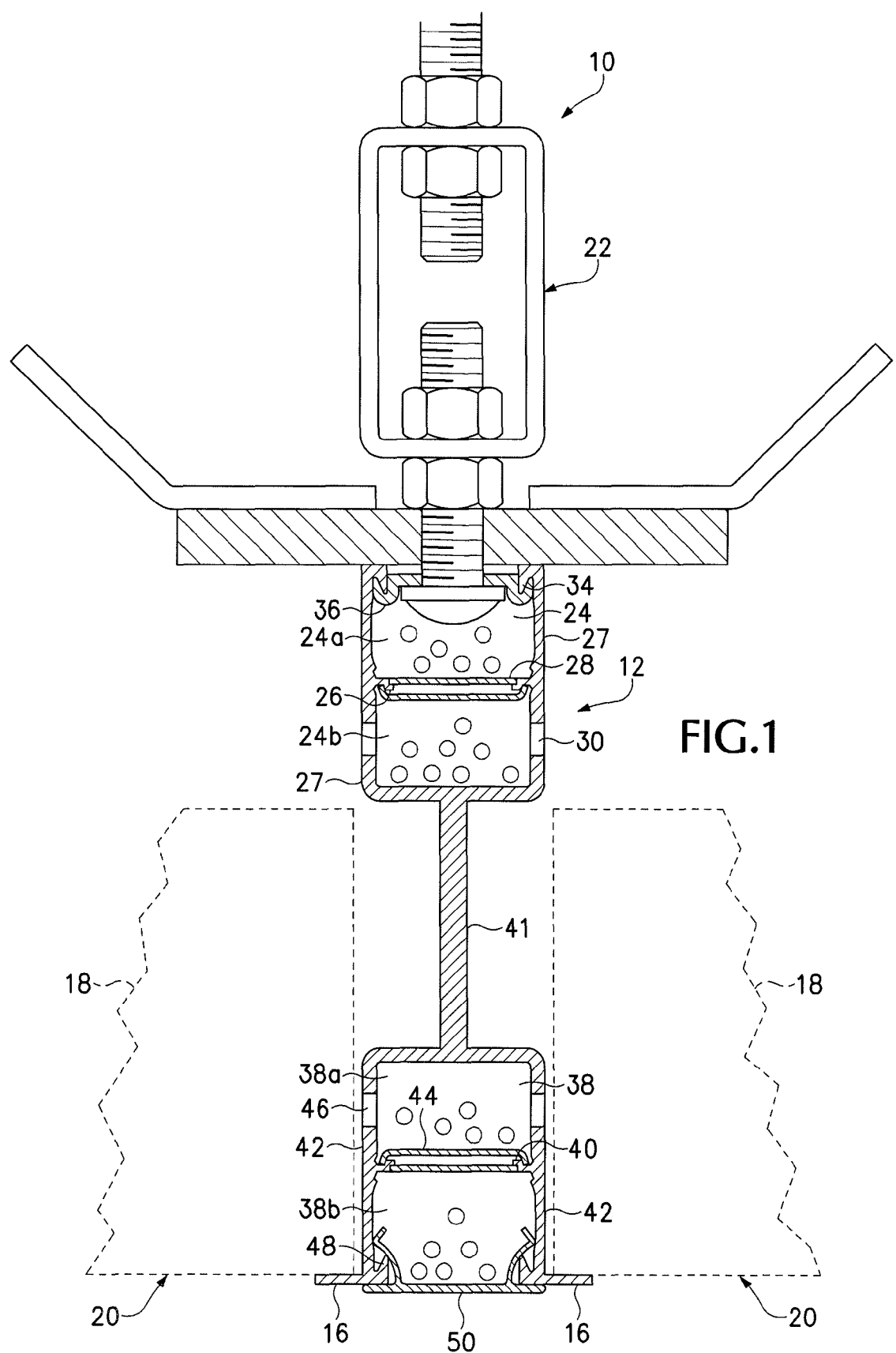
FIG. 1 is a side elevation view, partially in cross section, disclosing a grid system embodying the subject invention.

Referring now to FIG. 1 of the drawings, a grid system 10 for a suspended ceiling comprises a plurality of grid elements 12 which are interconnected to one another in an orthogonal grid pattern. Typically longitudinal grid elements 12(a) extend longitudinally across a defined space in side by side rows, and lateral grid elements 12(b) extend between adjacent longitudinal grid elements 12(a) at spaced-apart intervals. The lateral grid elements 12(b) are attached to the longitudinal grid elements 12(a) by connectors, such as L-shaped clips 14. Together the grid elements define a grid having a plurality of side by side rectangular openings 20. Referring now also to FIG. 1, flanges 16 which extend horizontally outward from each side of the grid elements into the opening removably support devices in the openings, such as the self-contained fan filter units 18 illustrated. Hangers 22 are used to suspend the grid elements below the top of the space. In most cases walkways, not shown, are located above the grid system and below the top of the space to allow access to the fan filter units 18 from above. Located at the upper end of each grid element 12 is an upwardly opening first cavity 24. If desired, locating tabs 26 can be placed midway in the opposed sidewalls 27 of the first cavity to divide the first cavity into an upper portion 24(a) and a lower portion 24(b) by inserting a plate 28 which is configured to engage the tabs 26 and snap into place. When the first cavity is divided into the upper and lower portions, openings 30 are located in the cavity sidewall 27 at spaced-apart intervals to provide access to the lower portion. Located at the upper end of the first cavity is a pair of inwardly-facing catches 34 which engage a top plate 36 which allows the grid element to be attached to the hanger 22.

Figure 5:
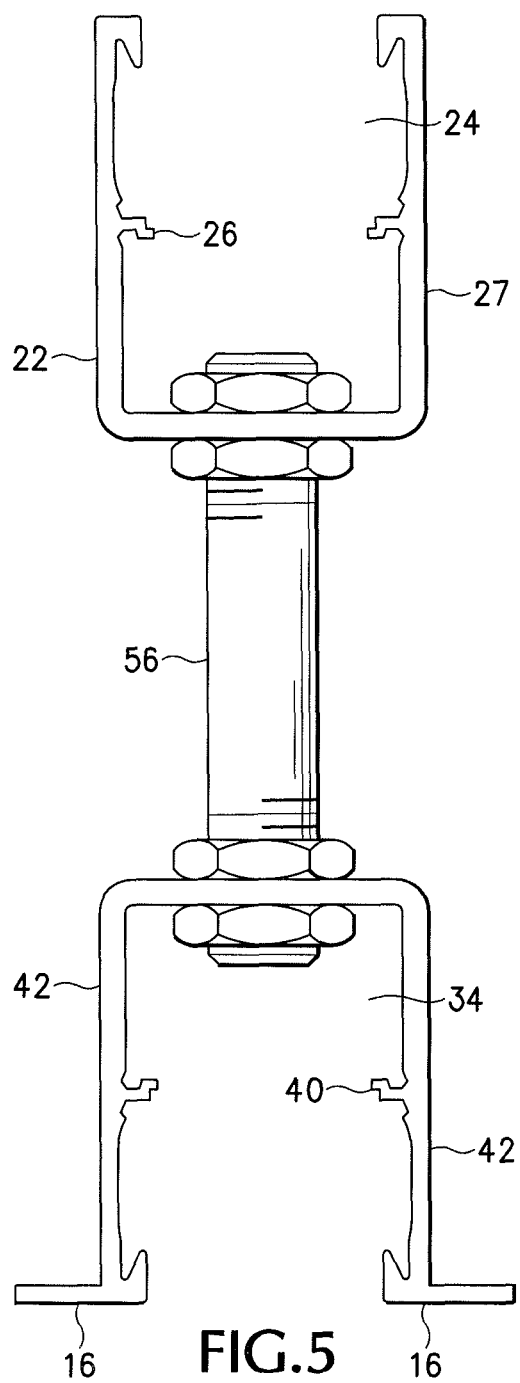
FIGS. 5 and 6 are side elevation views showing another embodiment of the invention.
Figure 6:
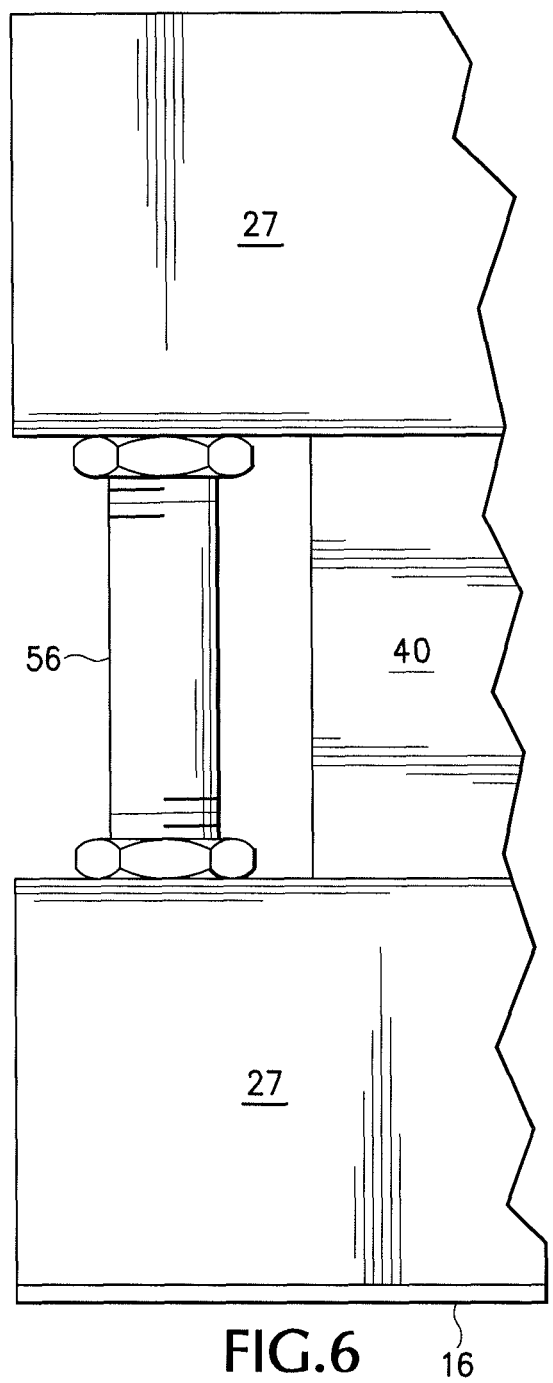
Figure 7:
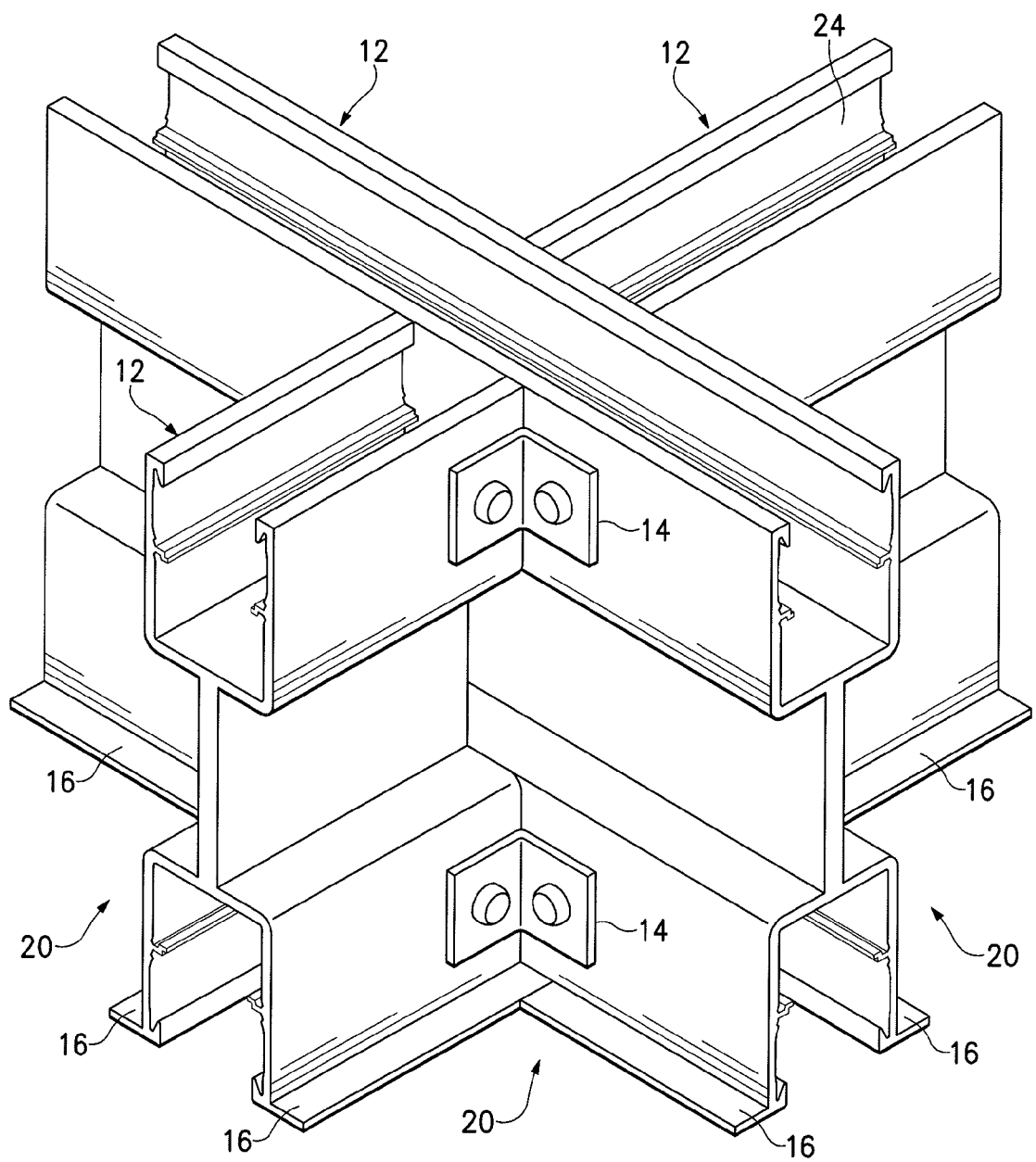
FIG. 7 is a perspective view showing grid elements attached into a portion of a grid system.

In a preferred embodiment the grid element also includes a second cavity 38 which is located below the first cavity 24 and opens downwardly. In the embodiment illustrated a web 41 extends between the first cavity and the second cavity, but the web is not necessary and the two cavities can be located directly on top of one another. In a preferred embodiment the second cavity also has tabs 40 located midway in its sidewalls 42. The tabs 40 engage a plate 44 which can be inserted into the second cavity to divide it into a top portion 38(a) and a bottom portion 38(b). Openings 46 are located in the sidewalls 42 to provide access to the top portion. A pair of inwardly facing catches 48 located at the bottom of the second cavity 38 engage a cover 50 which releasably encloses the bottom portion 38(b). If desired, a light 52 can be placed in the second cavity and a translucent cover 54 attached to the catches 48, FIG. 3. In an alternative embodiment, shown in FIGS. 5 and 6, there are breaks in the web 41 at spaced-apart intervals and hollow tubes 56 extend between the two cavities 24 and 38 at these locations. In another alternative embodiment, shown in FIG. 4, there is no second cavity and the flanges 16 are located at the bottom of the Web.

The grid system 10 provides a wire raceway that is integral with the grid elements 12 that opens upwardly and can be accessed from the walkway located above the suspended ceiling and the fan filter units. In addition this raceway can be divided into two portions thereby allowing high voltage and low voltage wiring to be carried independently of one another.

Figures 2, 3, 4:
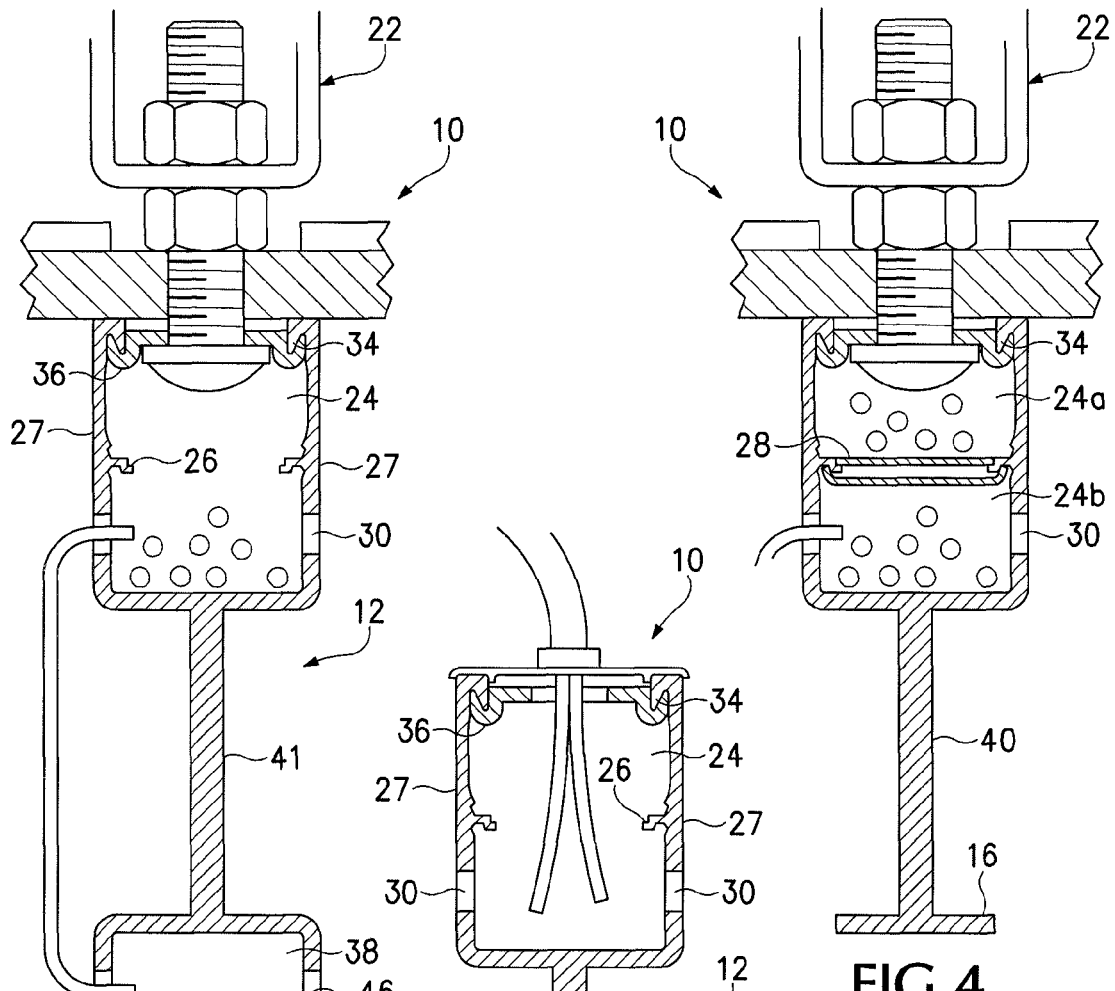
FIG. 2 is a side elevation view, partially broken away, disclosing another embodiment of the grid element.
FIG. 3 is a side elevation view, partially in cross section, disclosing still another embodiment of the subject invention.
FIG. 4 is a side elevation view showing still another embodiment of the subject invention.

This latter configuration is shown in FIG. 4. The grid system 10 can also have a separate wire raceway that opens downwardly and can be accessed below the ceiling. This also can be a single raceway, FIG. 2 or a double raceway, FIG. 1.

In use, the grid system provides multiple ways to carry the wiring that travels through the suspended ceiling system, with the wire being contained in raceways that are part of the grid elements. Moreover, the raceways extend longitudinally and laterally in the space the system is located in which permits flexibility in how the wire is arranged. In addition, wire can go between the upwardly facing raceway and the downwardly facing raceway by either passing it through the tubes 56, FIG. 5 or through the holes 30, 41 in the first and second cavities, FIG. 2.

The system minimizes or eliminates the need for cable trays or cable drops in the space above the ceiling grid. This clears out the space and allows easier access for maintenance activities and allows the space to be used for other utilities, such as air ducts. In addition the system minimizes the cost for installing and reconfiguring wiring since the wiring can be installed before the grid system is placed into the space thereby allowing technicians to work at deck level rather than working overhead. In addition the grid system reduces the cost and construction schedules by permitting most of the wiring to be installed in a factory before the grid system is installed in the space. The grid system can be used to power components in or on the grid system, such as recessed lighting, organization units, signing, etc. and can be used to power components not attached to the grid.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A grid element for supporting a suspended ceiling, the grid element comprising:
    an upper grid element including first walls and a bottom wall that cooperate to define an upper cavity having an upwardly facing opening that extends along at least a portion of a length of the grid element, the upper cavity including an upper raceway;
    a lower grid element including second walls and a top wall that cooperate to define a lower cavity having a downwardly facing opening that extends along at least at least a portion of a length of the grid element, the lower cavity including a lower raceway, the upper and lower raceways sized to receive at least one of wire and an electrical component therein, wherein the upwardly facing opening and the downwardly facing opening enable access to the at least one of wire and components in the upper and lower cavities from both above and below the grid element;
    at least two web extending between the bottom wall and the top wall to separate the upper grid element and the lower element, the two web sections positioned apart to define at least one gap therebetween;
    a hollow tube positioned within the at least one gap and extending between the bottom wall and the top wall to operably connecting the upper raceway and the lower raceway such that electrical wiring is navigable between the upper raceway and the lower raceway; and
    a top plate defining a generally planar portion positioned between side edges, the side edges being engagable by upper ends of the first walls proximate to the upwardly facing opening, the top plate for receiving at least one fastener to couple the grid element to a hanger that supports the grid element, wherein the top plate is elongated to enclose a portion of the upper raceway.

2. The grid element of claim 1 further comprising electrical wire extending along the raceway in the upper cavity.

3. The grid element of claim 1, wherein the electrical component represents recessed lighting.

4. The grid element of claim 1, wherein the top plate being spaced apart from the bottom wall to locate the upper raceway therebetween.

5. The grid element of claim 1, wherein the upper ends of the first walls includes catches proximate to the upwardly facing opening, wherein the top plate includes corresponding catches engagable to the catches of the first walls.

6. The grid element of claim 1, further comprising a light placed within at least one of the upper and lower raceways.

7. The grid element of claim 6, further comprising a translucent cover attached to the at least one of the first and second walls to cover the light.

8. The grid element of claim 1 wherein the first walls include a sidewall having a plurality of openings extending there through, and wherein the second walls include a sidewall having a plurality of openings extending there through, the openings being configured so that wire is extendable between the upper cavity and the lower cavity through the openings.

9. The grid element of claim 1, wherein the grid element is configured to couple to at least one other grid element to form a support grid.

10. The grid element of claim 9, wherein the support grid is configured to support ceiling-mounted equipment.

11. The grid element of claim 1 further comprising an electrical wire and an electrical component extending along the raceway in the upper cavity.

12. The grid element of claim 1 further comprising an electrical wire and an electrical component extending along the raceway in the lower cavity.

13. The grid element of claim 1 further comprising an electrical wire extending along the raceway in the upper cavity and an electrical component extending along the raceway in the lower cavity.

14. The grid element of claim 1 further comprising an electrical wire extending along the raceway in the lower cavity and an electrical component extending along the raceway in the upper cavity.

15. The grid element of claim 1, wherein the upwardly facing opening enables access to the upper cavity continuously along the length of the cavity.

16. The grid element of claim 1, wherein the downwardly facing opening enables access to the lower cavity continuously along a length of the cavity.

17. The grid element of claim 1, wherein the upwardly facing opening comprises a continuously extending elongated passage.

18. The grid element of claim 1, wherein the downwardly facing opening comprises a continuously extending elongated passage.

19. The grid element of claim 1, wherein the second walls each include a catch to releasable receive a plate that divides the lower cavity into an upper portion and a lower portion.

20. The grid element of claim 1, wherein the first walls each include a catch to releasable receive a plate that divides the upper cavity into an upper portion and a lower portion.

21. A grid element for supporting a suspended ceiling, the grid element comprising:

an upper grid element including first walls and a bottom wall that cooperate to define an upper cavity having an upwardly facing opening that extends along at least a portion of a length of the grid element and a closed lower end opposite the upwardly facing opening, the first walls defining a width between the first walls and a height defined between the upwardly facing opening and the closed lower end, the upper cavity including an upper raceway;

a lower grid element including second walls and a top wall that cooperate to define a lower cavity having a downwardly facing opening that extends along at least at least a portion of a length of the grid element, the lower cavity including a lower raceway, the upper and lower raceways sized to receive at least one of wire and an electrical component therein, wherein the upwardly facing opening and the downwardly facing opening enable access to the at least one of wire and components in the upper and lower cavities from both above and below the grid element;

at least two web extending between the bottom wall and the top wall to separate the upper grid element and the lower element, the two web sections positioned apart to define at least one gap therebetween;

a hollow tube positioned within the at least one gap and extending between the bottom wall and the top wall to operably connecting the upper raceway and the lower raceway such that the wire is navigable between the upper raceway and the lower raceway; and a top plate defining a generally planar portion positioned between side edges, the side edges being engagable by upper ends of the first walls proximate to the upwardly facing opening, the top plate for receiving at least one fastener to couple the grid element to a hanger that supports the grid element, wherein the height of the first walls creates a minimum distance from the fastener and the closed lower end greater than the width between the first walls, wherein the top plate is elongated to enclose a portion of the upper raceway.

22. The grid element of claim 19, wherein the hollow tube extends through the lower portion of the upper raceway to convey wires from the upper portion of the upper raceway to the lower raceway.

23. The grid element of claim 20, wherein the hollow tube extends through the upper portion of the lower raceway defined by the plate to convey wires from the lower portion of the lower raceway to the upper raceway.

* * * * *